United States Patent [19]
Frame et al.

[11] Patent Number: 5,638,532
[45] Date of Patent: Jun. 10, 1997

[54] APPARATUS AND METHOD FOR ACCESSING SMRAM IN A COMPUTER BASED UPON A PROCESSOR EMPLOYING SYSTEM MANAGEMENT MODE

[75] Inventors: Robert C. Frame, Westboro; Mark J. Foster, Acton, both of Mass.

[73] Assignee: Digital Equipment Corporation, Maynard, Mass.

[21] Appl. No.: 350,343

[22] Filed: Dec. 6, 1994

[51] Int. Cl.$^6$ .............................. G06F 13/14; G06F 12/00
[52] U.S. Cl. ...................... 395/481; 395/412; 395/466; 395/474
[58] Field of Search ................................. 395/412, 479, 395/497.01, 427, 428, 481, 466, 469, 474

[56] References Cited

U.S. PATENT DOCUMENTS

| | | | |
|---|---|---|---|
| 5,175,853 | 12/1992 | Kardach et al. | 395/479 |
| 5,274,834 | 12/1993 | Kardach et al. | 395/800 |
| 5,276,888 | 1/1994 | Kardach et al. | 395/734 |
| 5,339,437 | 8/1994 | Yuen | 395/700 |
| 5,386,552 | 1/1995 | Garney | 395/182.08 |
| 5,475,829 | 12/1995 | Thome | 395/479 |
| 5,509,139 | 4/1996 | Ayash et al. | 395/869 |

OTHER PUBLICATIONS

Intel486 SL Microprocessor SuperSet System Design Guide, Chapter 12 Nov. 1992.

*Primary Examiner*—Tod R. Swann
*Assistant Examiner*—Conley B. King, Jr.
*Attorney, Agent, or Firm*—Ronald C. Hudgens; Arthur W. Fisher; Mary M. Steubing

[57] ABSTRACT

Computer systems using a processor that is capable of operating in a system management mode (SMM) employ a dedicated system management RAM (SMRAM). The processor uses the SMRAM when the processor is performing a task associated with the SMM. The processor is capable of generating a range of system addresses. The range includes a particular subrange of system addresses that are used for accessing the SMRAM. A memory controller decodes the system addresses generated by the processor and enables access to the SMRAM, regardless of whether the processor is operating in the SMM, when the controller decodes a system address of the particular subrange. The range of system addresses also includes a second subrange. The memory controller also enables access to the SMRAM when the processor is operating in the SMM and the controller decodes a system address of the second subrange. The memory controller indicates to the processor whether data associated with the enabled SMRAM can be stored in a cache memory.

17 Claims, 5 Drawing Sheets

APPARATUS AND METHOD FOR ACCESSING SMRAM IN A COMPUTER BASED UPON A PROCESSOR EMPLOYING SYSTEM MANAGEMENT MODE

BACKGROUND OF THE INVENTION

The invention relates to processor based personal computer hardware implementations, and particularly to implementations for processors employing System Management Mode such as those from Intel Corporation.

Computer systems employing a microprocessor such as the SL Enhanced INTEL486 microprocessor (and follow-ons) from Intel Corporation can take advantage of an operating mode unique to that architecture and known as "System Management Mode" (SMM). SMM can be used by the system firmware to control product-specific hardware features in a manner which is transparent to the Operating System and applications software. SMM may be used, for example, for system management information such as the system configuration or the configuration of a powered-down device, or to invoke a power-saving routine such as a zero-volt suspend function.

SMM is, however, subject to certain inefficiencies in MS-DOS™ compatible personal computer systems. When operating in SMM, a microprocessor such as the INTEL486 microprocessor and subsequent processors from Intel Corporation accesses a dedicated system management random access memory known as SMRAM. SMRAM can be implemented in one of two ways. First of all, SMRAM can occupy an area of memory having a uniquely addressable location—known as "non-overlaid" memory. In such an arrangement, SMRAM is fully cacheable in the processor's internal cache. However, in such personal computer systems, the first megabyte of memory space is mapped according to software compatibility requirements, forcing SMRAM to be located beyond the first megabyte of addressable memory space. But operating from memory spaces beyond the first megabyte has certain restrictions associated with it according to the processor architecture—in particular, far jumps are restricted and code size is constrained to 64K segments.

Therefore a second SMRAM implementation is more typically used in personal computer system designs. Accordingly, SMRAM is addressed such that it overlays some other area of system memory in the first megabyte—that is, it is addressed at the same location as the other area. When the processor is in normal mode, accesses to that location of system memory are treated normally. When in SMM, accesses to that location are redirected to SMRAM. The processor is unaware of the remapping.

Because the processor is unaware of the remapping, its internal cache cannot differentiate between the two physically separate memories. Cache coherency is thus compromised. This problem is currently approached in either of two ways: by making SMRAM non-cacheable, or by doing cache invalidate cycles upon entry and exit from SMM. Both of these schemes negatively impact performance by making ineffective use of the cache.

As SMM applications expand they continue to demand greater proportions of processor time. Thus, there is an increasing need for a more efficient SMRAM implementation.

SUMMARY OF THE INVENTION

In accordance with the present invention, there is provided an SMRAM implementation for a computer system which provides both the cacheability advantage of non-overlaid SMRAM and the programming flexibility of overlaid SMRAM.

In general there is provided a computer system comprising a CPU employing System Management Mode coupled to an address bus and a data bus and SMRAM coupled to the address and data bus for access by the CPU when the CPU is in SMM. Also included is a memory controller coupled to the address bus for decoding the address bus into a plurality of system address spaces. The memory controller is coupled to the SMRAM for enabling data transfers between areas of the SMRAM and the CPU. The memory controller enables the SMRAM in response to the decoding of a first system address space when the CPU is in SMM. The memory controller also enables the SMRAM in response to the decoding of a second system address space when the CPU is in SMM.

Preferably the first system address space is in the lower megabyte of system addressable space, while the second system address space is located beyond the first megabyte of system addressable space. As a result, SMRAM is fully cacheable when decoded from the second system address space, while SMM code requiring flexibility which can only be provided by execution from the lower megabyte can be decoded from the first system address space.

According to one embodiment, a system memory is coupled to the address and data bus, the SMRAM comprising one area of the system memory. According to this embodiment the computer system includes a CPU employing System Management Mode (SMM), such as an INTEL486™ or subsequent microprocessor from Intel Corporation, a system memory, and a memory controller all coupled to an address bus. The memory controller decodes the address bus into a plurality of system address spaces. The memory controller enables a first area of system memory in response to the decoding of a first system address space when the CPU is not in SMM. The memory controller enables a second area of system memory in response to the decoding of the first system address space when the CPU is in SMM. The memory controller also enables the second area of system memory in response to the decoding of a second system address space when the CPU is in SMM. The memory controller can enable the second area of system memory in response to the decoding of the second system address space at all times. The CPU can thereby access SMRAM via the second address space when not in SMM.

DETAILED DESCRIPTION OF THE PREFERRED EMBODIMENT

Figure 1:
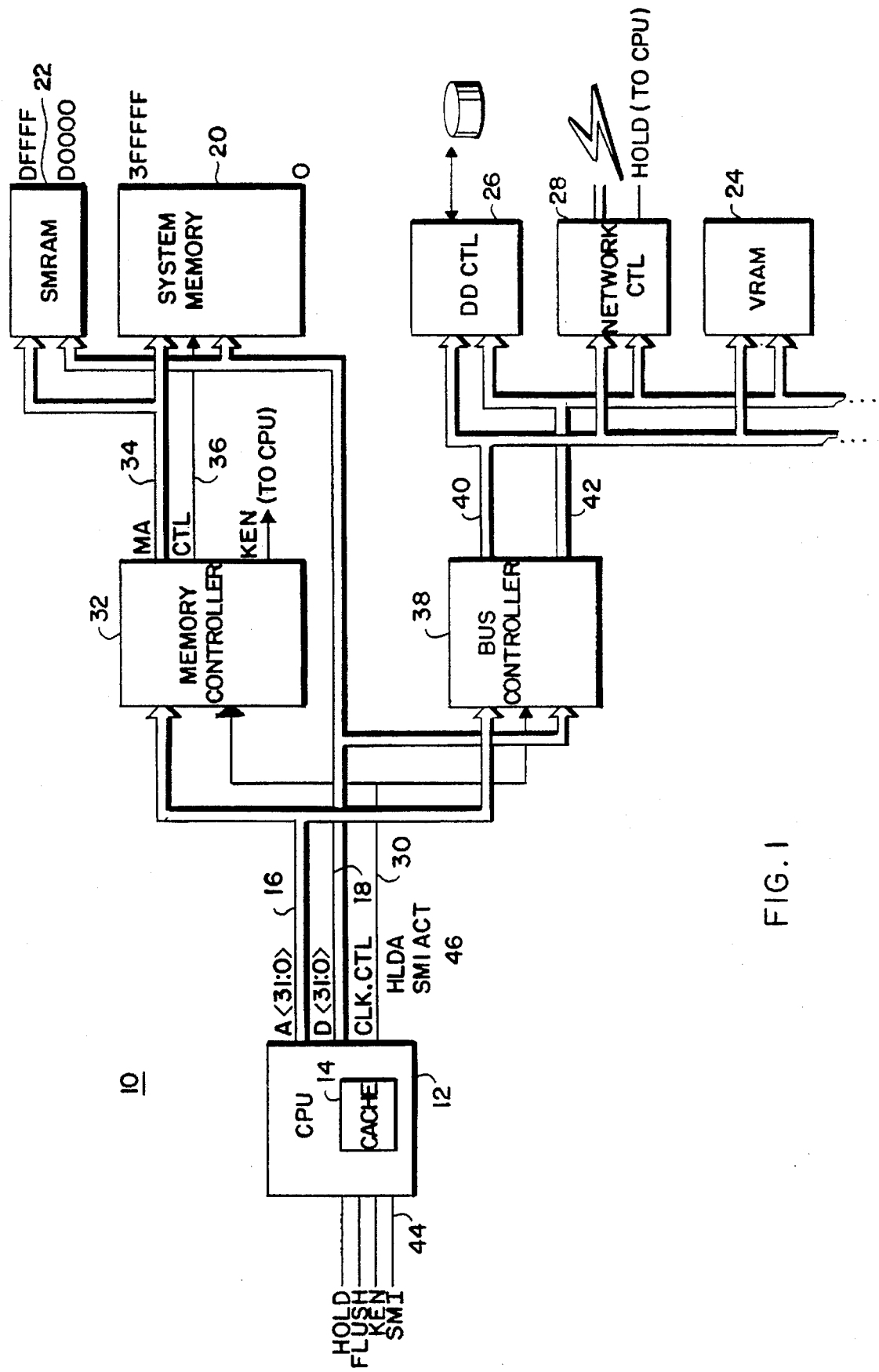
FIG. 1 is a block diagram of a computer system wherein SMRAM is employed according to the principles of the invention.

Referring now to FIG. 1 there is shown a logical block diagram of a personal computer system 10 embodying the principles of the invention. Within the computer system 10 a CPU 12 containing an internal cache 14 is coupled via an address bus 16 and data bus 18 to a system memory 20 and SMRAM 22, a video memory 24, and various I/O peripheral devices such as a disk drive controller 26 and a network controller 28.

More particularly, the CPU 12 is coupled via the address bus 16 and CPU control signals 30 to a memory controller 32, which is in turn coupled to the system memory 20 and SMRAM 22. The memory controller 32 provides memory address lines 34 and memory control signals 36 to the system memory 20 and SMRAM 22 to enable data transfers between the system memory 20 or SMRAM 22 and the CPU 12 via the data bus 18.

The CPU 12 is also coupled via the address bus 16, data bus 18, and CPU control signals 30 to a bus controller 38, which is in turn coupled via a system address bus 40 and system data bus 42 to the video memory 24, network controller 28, and disk drive controller 26, and any other peripheral devices.

The computer system 10 of FIG. 1 may be embodied for example as a desktop computer, a notebook computer, or a server, and may or may not include all of the devices shown in FIG. 1. When embodied as a server, for example, no video memory 24 is required.

In the preferred embodiment shown the CPU 12 is an SL Enhanced INTEL486™ Microprocessor from Intel Corporation—though it is understood that the invention can be advantageously implemented in any computer system employing any of the SL Enhanced CPU family of INTEL® microprocessors. This family of INTEL® microprocessors employs System Management Mode (SMM)—a unique INTEL® architecture developed by Intel Corporation employing a dedicated interrupt line SMI (line 44 of FIG. 1) and memory space SMRAM 22. SMM is used to implement intelligent power management and other enhanced system functions in firmware in a manner which is completely transparent to the operating system and applications software.

SMM is invoked by generating a System Management Interrupt via assertion of the SMI signal 44 to the CPU 12. The CPU 12, in response, asserts the SMIACT control signal, and then accesses SMRAM 22—a memory space dedicated and secured for use in SMM only—i.e. the operating system and applications software do not have access to this space. The current CPU 12 state (context) is stored in SMRAM 22 after assertion of the SMIACT signal, and the CPU 12 then jumps to a location in SMRAM 22 to execute the SMI handler code for performing the system management activities. Upon completion of the system management activities, the SMI handler executes a resume (RSM) instruction which restores the CPU 12's context from SMRAM 22, de-asserts the SMIACT signal, and then returns control to the previously interrupted OS or application program execution.

Figure 2:
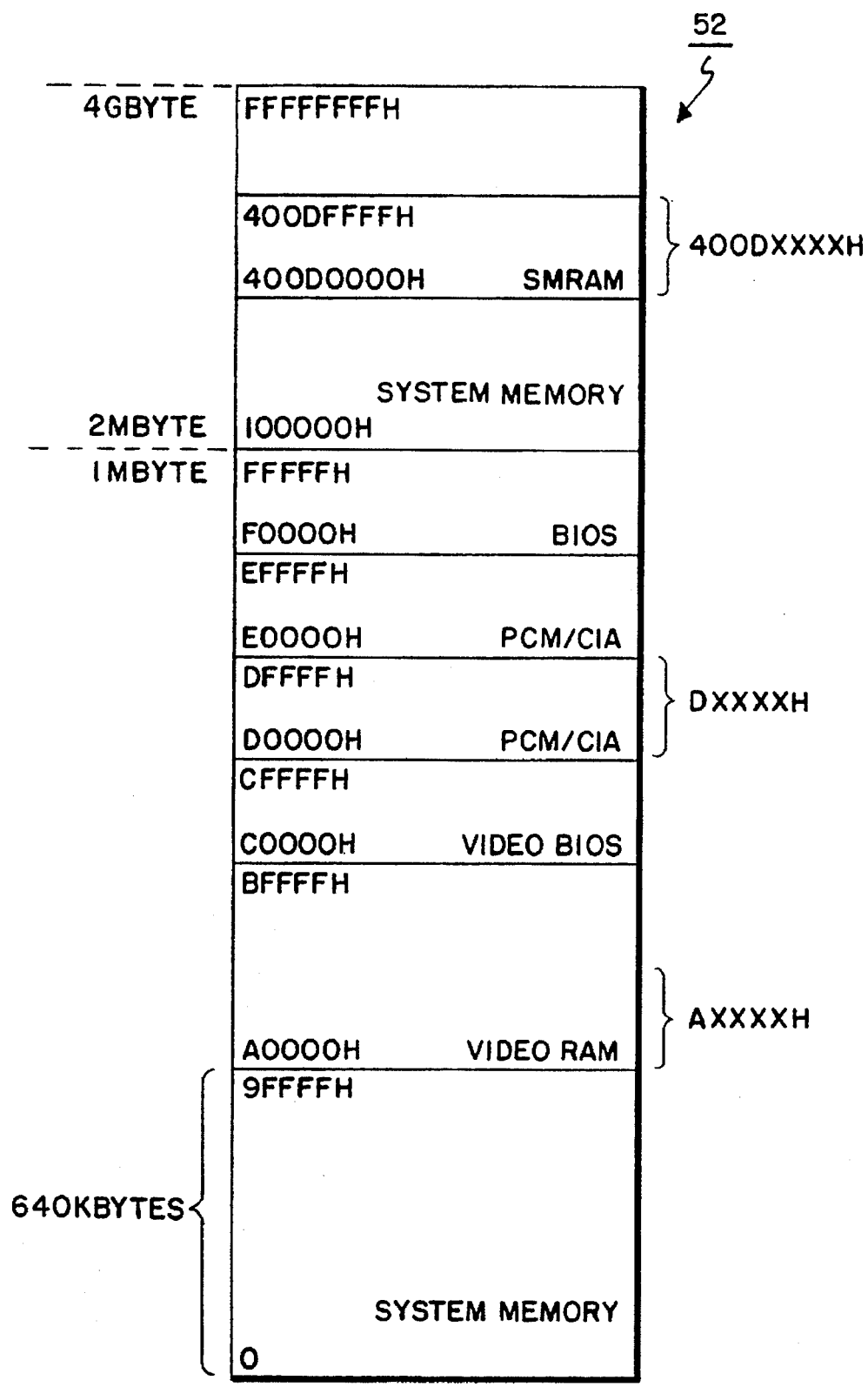
FIG. 2 is a representative system address map for the computer system shown in FIG. 1.

Referring now to FIG. 2, there is shown one possible partial system address mapping for the computer system 10 of FIG. 1, which is typical of available MS-DOS™ compatible personal computer systems. For clarity of description addresses driven by the CPU 12 must be distinguished from address locations in the physical system memory 20. Therefore addresses asserted by the CPU 12 on the address bus 16 are herein referred to as "system" addresses, while addresses of locations in system memory are referred to as "memory" addresses. Addresses are referred to in hexadecimal format, denoted by the suffix 'H'. A range of addresses is referred to as an address "space", and is denoted by placing 'X's in the hexadecimal address places that fall within the space. For example, the address space covering the range of addresses between B0000H and BFFFFH is denoted BXXXXH.

The lowest 640 Kbytes of system address, that is system addresses 0H–9FFFFH, map to system memory 20. System addresses A0000H–BFFFFH map to video memory 24. System addresses C0000H–CFFFFH map to Video BIOS code. System addresses D0000H–DFFFFH and E0000H–EFFFFH are often mapped to separate PCMCIA peripheral areas respectively, or may be mapped to other types of peripheral devices. System addresses F0000H–FFFFFH are reserved for BIOS code. System addresses 100000H (1 Mbyte) and beyond are mapped to system memory for applications use. According to this mapping, MS-DOS™ compatible personal computer systems must employ system memories of at least 640 Kbytes in size, and typically employ much larger system memories commonly ranging from 1 megabyte (Mbyte) to 16 Mbytes or more in size.

According to the INTEL® microprocessor architecture, program code executing in "Real Mode" resides in the lower 1 Mbyte of the system address space—that is, from 0H to FFFFFH—and has greater flexibility than "Protected Mode" code residing above the first Mbyte—that is, from 100000H and beyond. Code residing above the first Mbyte is restricted in size to 64 Kbyte segments, and is restricted from using far "jump" instructions to access code outside of the segment in which it resides. This restriction is particularly odious to routines which require calls to the system BIOS code, which resides in the lower Mbyte. Thus, when executing system management code via SMM which requires BIOS calls, it is desirable to execute the code from the lower Mbyte of the system address space.

However, as can be seen in the address mapping of FIG. 2, the lower Mbyte of system address space in a typical personal computer system is already fully mapped for software compatibility. Thus, in order to execute system management code from the low Mbyte of system address space, SMRAM must be "overlaid" with regular system memory. That is, both SMRAM and normal system memory are addressed at a single range of system address locations, so the physical memory being addressed at a given time is dependent upon whether the CPU is in SMM. For example, SMRAM can be mapped to reside at system address locations D0000H–DFFFFH. When in normal operating mode, an access to system address D0000H by the processor is directed via the decoder to the memory address D0000H in system memory. But when in SMM, an access to system address D0000H by the processor is directed via the decoder to SMRAM, wherever SMRAM is physically located.

The previously described overlaid SMRAM implementation has in the past been subject to cache coherency problems, as the CPU's internal cache cannot distinguish SMRAM from system memory for a given system address. SMM code executing from the first Mbyte is thus subject to performance degradation. By implementing SMRAM in a non-overlaid manner, however—for instance, by locating it in a dedicated memory space logically addressed above the first megabyte—SMRAM is fully cacheable, but subject to coding size and jump restrictions undesirable for certain routines.

Figure 3:
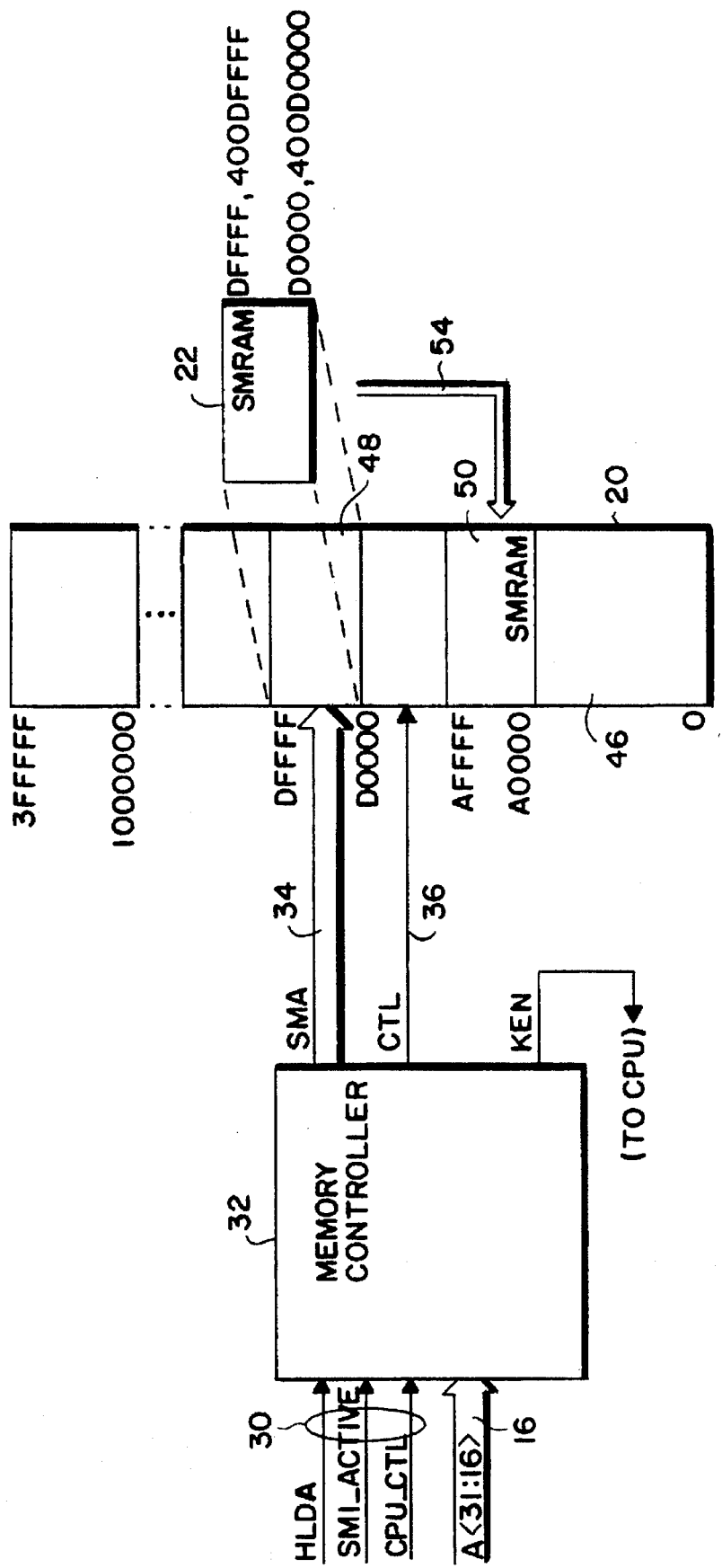
FIG. 3 is a high level block diagram of the memory controller, system memory, and SMRAM of FIG. 1.

According to the principles of the invention, there is provided an SMRAM implementation which allows caching of certain SMRAM code, while also freeing certain SMRAM code from the restrictions associated with execution from system addresses beyond the first Mbyte. Referring now to FIG. 3, there is shown the memory controller 32 and the system memory 20. The system memory 20 is divided into a plurality of physically separate areas of memory 46, 48, 50, etc., each accessed via a range of physical memory addresses. The memory controller 32 accepts as input the upper 16 bits of the address bus 16, A<31:16>, and CPU control signals 30 including SMIACT and HLDA. SMIACT is asserted whenever the CPU is in SMM. HLDA is asserted when another device, for example a network controller, has taken control of the address bus 16 and data bus 18 from the CPU 12, and will be further discussed later. The memory controller 32 decodes the address bus 16 signals and the CPU control signals 30 into a particular system address of system address space 52 (see FIG. 2). The memory controller 32 produces memory address lines 34 and memory control signals 36 for enabling data transfer between the CPU 12 and the system memory 20 or the SMRAM 22, depending upon the particular decoded system address of system address space 52.

The memory controller operates generally as follows. The memory controller 32 enables SMRAM 22 in response to the decoding of a first system address in a first system address space when the CPU is in SMM. The first system address can be for example in the DXXXXH system address space. Thus, when the address bus 16 signals A<31:16> indicate that the CPU 12 is accessing a location in the DXXXXH space, and the SMIACT signal is deasserted, indicating that the CPU 12 is not in SMM, system memory 20 is accessed at the requested location. However, when the address bus 16 signals A<31:16> indicate that the CPU 12 is accessing a location in the DXXXXH space, and the SMIACT signal is asserted, indicating that the CPU 12 is in SMM, SMRAM 22 is accessed. The SMRAM 22 therefore overlays system memory 20 for the range of system addresses between D0000H and DFFFFH.

In addition, the memory controller enables SMRAM in response to the decoding of a second system address in a second system address space whether or not the CPU 12 is in SMM. The second system address space may be for example the 400DXXXXH space. When the address bus 16 signals A<31:16> indicate that the CPU 12 is accessing a location in the 400DXXXXH space, regardless of whether the CPU is in SMM, SMRAM_EN is asserted and the CPU 12 accesses SMRAM 22. The addressable space defined between 400D0000H and 400DFFFFH is located beyond the first Mbyte of system addressable space and is reserved as SMRAM space only. Thus, when accessed by the CPU 12 within the addressable space 400DXXXXH, the SMRAM 22 is non-overlaid and therefore is fully cacheable.

This SMRAM implementation is advantageous in that system management code which does not require long jumps or access to BIOS code can be executed from the 400DXXXXH address space, which is a fully cacheable address space, thus providing maximum performance. Other system management code requiring long jumps or BIOS calls can be executed from the DXXXXH address space. However, since the DXXXXH space is overlaid, caching of this space must be disabled or the cache must be flushed prior to entrance and following exit from SMM.

According to the preferred embodiment, the SMRAM 22 is actually implemented as an area 50 of system memory 20. The area 50 of memory physically addressed between memory addresses A0000H and AFFFFH is not normally used, since CPU 12 system addresses within this range are directed to video memory 24 (see FIG. 2). Thus, SMRAM accesses can be mapped to the physical memory address space AXXXXH. Accordingly, when the address bus 16 signals A<31:16> indicate that the CPU 12 is accessing a location in a first system address space DXXXXH, and the SMIACT signal is deasserted, indicating that the CPU 12 is not in SMM, a first area 48 of system memory 20 is accessed at the memory address space DXXXXH. However, when the address bus 16 signals A<31:16> indicate that the CPU 12 is accessing a location in the first system address space DXXXXH, and the SMIACT signal is asserted, indicating that the CPU 12 is in SMM, SMRAM is accessed at a second area 50 of system memory 20 in the memory address space AXXXXH. (This is denoted in FIG. 3 by an arrow 54 pointing from SMRAM 22 to the AXXXXH space 50.) Thus, the system memory 20 at memory addresses A0000H through AFFFFH overlays the system memory 20 at memory addresses D0000H through DFFFFH.

In addition, when the address bus 16 signals A<31:16> indicate that the CPU 12 is accessing a second system address in the 400DXXXXH space, regardless of whether the CPU is in SMM, the CPU 12 accesses the second area 50 of system memory 20 in the memory address space AXXXXH. The system address space 400DXXXXH is reserved as SMRAM space only. Thus, when accessed by the CPU 12 in the addressable space between 400D0000H and 400DFFFFH, the system memory 20 is always accessed at the physical range of memory addresses between A0000H and AFFFFH, and is therefore non-overlaid and thus fully cacheable.

The implementation previously described can be further refined to support bus master accesses to system memory. Referring back to FIG. 1, a bus master is a peripheral device, for example the network controller 28 (FIG. 1), that assumes control of the system address bus 16, data bus 18, and certain of the CPU 12's control signals via assertion of the HOLD signal to the CPU. During the time that such a device operates as a bus master, the CPU asserts the HLDA signal. The CPU can permit a bus master to assume control of the system address bus 16 and data bus 18 when the CPU is in SMM. In the event that the bus master addresses the area 48 in system memory which is re-mapped to SMRAM when the CPU is in SMM—i.e. a bus master attempts to access D0000H when the CPU is in SMM—the bus master accesses should be directed to the system memory area D0000H—not SMRAM at A0000H.

Figure 4:
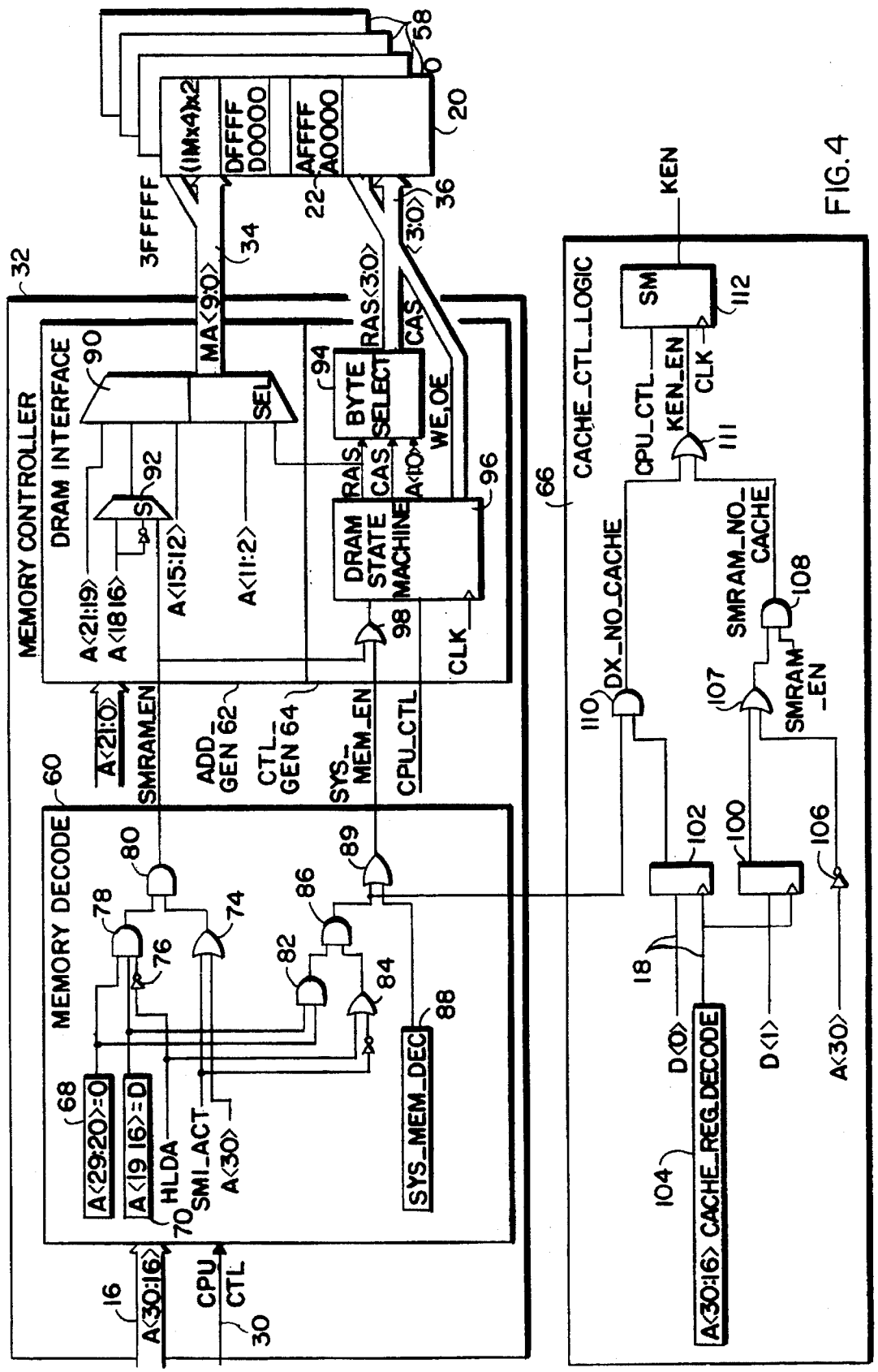
FIG. 4 is a detailed logical representation of the operation of the memory controller of FIG. 3 according to the principles of the invention.

Referring now to FIG. 4, there is shown a logical representation of one of many possible implementations of the preferred embodiment of the memory controller 32. All signals shown and discussed are considered active high—or asserted at a logic '1'—for ease of description. For purposes of example, the system memory is shown to comprise 8 1M×4 DRAMs 58 for a total of 4 Megabytes of system memory arranged to provide a 32 bit memory data bus width. Such DRAMs 58 typically accept a 10 bit address bus input which is multiplexed to access 1 Mbyte of addressable locations. Thus, the memory controller 32 generates memory address lines MA<9:0> (34) as address inputs to the DRAMs 58. The memory controller 32 also generates byte-wise memory control signals 36 including RAS, CAS<3:0>, and the write enable signal WE and output enable signal OE. It is understood that for a given implementation, the actual number of RAS and CAS memory control signals 36 and MA memory address lines 34 depends upon the memory configuration and the size of the DRAMs used to implement the system memory 20.

The memory controller 32 includes a decoder 60, a memory address generator 62, a memory control signal generator 64, and cache control logic 66. The decoder 60 accepts as input the address bus 16 signals A<30:16> and the CPU control signals 30 including SMI_ACT and HLDA, and produces in response the signals SYS_MEM_EN and SMRAM_EN. SYS_MEM_EN is asserted for accesses to system memory 20 which do not target the DXXXXH address space, and for accesses to system memory 20 in the DXXXXH address space by a bus master, or by the CPU 12 when the CPU 12 is not in SMM. SMRAM_EN is asserted when the CPU 12 is in SMM and is accessing SMRAM, either in the DXXXXH space or in the 400DXXXXH space. Thus, for accesses to system memory space, SYS_MEM_EN is asserted whenever SMRAM_EN is deasserted.

Accordingly, address decoder circuits 68 and 70 within the decoder 60 decode the address signals A<29:16> to '0D'H. When SMI_ACT is asserted as indicated at the output of 'OR' gate 74, indicating that the CPU 12 is in SMM, and A<29:16> indicate an access to the system address space '0DXXXX'H and HLDA is not asserted, as indicated by the outputs of invertor 76, 'AND' gate 78, and 'AND' gate 80, SMRAM_EN is asserted. A<30> can be ignored in decoding SMRAM_EN in this instance, since both system address spaces DXXXXH and 400DXXXXH map to the same SMRAM 22 memory address space at AXXXXH when the CPU 12 is in SMM. However, when the CPU 12 is not in SMM, SMRAM_EN is enabled only if HLDA is deasserted and A<30> and A<19:16> indicate that the CPU 12 is attempting to access 400D0000H–400DFFFFh, as indicated by 'OR' gate 74.

When decoders 68 and 70 within the decoder 60 indicate that either the CPU 12 or a bus master is attempting to access D0000H–DFFFFH as indicated when the output of 'AND' gate 82 is asserted, and either HLDA is asserted or SMI_ACT is deasserted as indicated by the output of 'OR' gate 84, the output of 'AND' gate 86 is asserted and SYS_MEM_EN is asserted. The CPU 12 or bus master is thereby directed to the D0000H–DFFFFH space during bus master control or whenever the CPU 12 is not in SMM. The decoder 88 decodes in a conventional manner all other areas of the system address map which decode to system memory 20. The output of decoder 88 is thus 'or'ed via 'OR' gate 89 with the output of the 'AND' gate 86, providing assertion of the SYS_MEM_EN signal for the entire system memory space.

Alternatively, the SYS_MEM_EN signal can be generated by 'AND'ing the SYS_MEM_EN decode with inverted SMRAM_EN, such that accesses to system memory 20 are enabled whenever accesses to SMRAM are 22 disabled.

The memory address generator 62 accepts as input the SMRAM_EN signals and the address bus 16 signals A<21:0> and generates in response memory address lines 34 MA<9:0>. In order to generate MA<9:0>, 20 bits of the system address bus 16 signals are multiplexed onto the MA<9:0> lines. For a longword addressable system memory 20, address bus 16 signals A<21:2> are multiplexed via multiplexer 90 to provide MA<9:0>. According to the example shown, the most significant half of a memory address is asserted on MA<9:0> upon assertion of the RAS signals, while the least significant half of the memory address is asserted upon assertion of the CAS signals—though this arrangement is not required and many other schemes are commonly used. Thus, during a normal system memory access wherein SMRAM_EN is deasserted, MA<9:0> are multiplexed from A<21:12> during the assertion of the RAS signals to A<11:2> during the assertion of the CAS signals respectively.

However, when SMRAM_EN is asserted, addresses normally indicating an access to the DXXXXH space must now indicate an access to the AXXXXH space. Thus, A<18:16> are inverted when in SMM. The multiplexer 92 is thus provided, its strobe input being driven by the SMRAM_EN signal. Inverted A<18:16> is thereby enabled onto the MA<7:4> lines during the RAS address portion of an SMRAM 22 access. Thus, though the CPU 12 drives a system address somewhere in the range of D0000H to DFFFFH or 400D0000H to 400DFFFFH, the memory address driven to the DRAMs redirects the access to the A0000H to AFFFFH range via the address line multiplexer 92.

The memory control signal generator 64 portion of the memory controller 32 includes a state machine 96 and byte select logic 94. The state machine 96 accepts as input the CPU control signals 30 and the SMRAM_EN and SYS_MEM_DEC signals from the decoder 60. The SMRAM_EN and SYS_MEM_DEC signals are logically 'or'ed' via OR gate 98. The output of OR gate 98 is therefore enabled for any system memory or SMRAM access. Whenever the state of the CPU control signals 30 indicate that a transaction is occurring and the SMRAM_EN or SYS_MEM_DEC signals are asserted, the state machine produces RAS, CAS, WE, and OE signals, the timing of these signals provided as specified for the particular DRAMs 58 used. The design of a state machine 96 for producing DRAM control signals is well understood by those skilled in the art. The RAS and CAS signals are fed to the byte select logic 94, where they are logically combined with the lowest order address bits A<1:0> to produce the RAS and CAS<3:0> memory control signals 36. The RAS and CAS<3:0> signals are driven to the DRAMs during memory accesses, thereby providing bytewise resolution for system memory accesses. Alternatively, where the CPU 12 employed is a 486, byte mask signals provided by the CPU 12 can be monitored rather than lower order address bits A<1:0> to produce RAS and CAS<3:0>.

The flexibility of the SMRAM implementation according to the principles of the invention allows caching of SMRAM 22 when SMRAM 22 is accessed from the 400DXXXXH address space. However, it may be desirable to be able to specify whether or not SMRAM 22 or the overlaid area in system memory 20 is cacheable. For instance, referring to the preferred embodiment of FIGS. 3–4, if a bus master, for instance the network controller 28 (FIG. 1), is allowed access to the DXXXXH space, it may be advantageous to set this space as non-cacheable in order to avoid cache coherency problems between the bus master device and the CPU 12. In addition, it may be desirable to set SMRAM 22 as non-cacheable all of the time: for instance, in the event that the large majority of SMM routines are calling the BIOS. Accordingly, the memory controller 32 includes cache control logic 66 for setting the cacheability of these spaces and manipulating the cache control inputs to the CPU 12.

The INTEL® 486 series processors accept as input two different cache control signals: FLUSH and KEN. When FLUSH is asserted, the entire cache is emptied. When KEN is deasserted during a bus transaction, the transaction is not cached. Thus, the cache control logic 66 can use either of these two signals to control the cacheability of memory spaces. FLUSH is expensive in terms of the time it takes to flush the entire cache and thus it is desirable to minimize its use for performance reasons. FLUSH is therefore advantageously used only when the CPU 12 makes continuous successive accesses to a particular non-cacheable space. KEN is advantageously used for more random accesses to non-cacheable spaces. In the example implementation shown in FIG. 4, KEN is used to disable caching of SMRAM 22 or the DXXXXH space when necessary.

Accordingly, the cache control logic 66 accepts as input the address bus 16 signals A<30:16>, the CPU control signals 30, the data bus 18 signals D<1:0>, SMRAM_EN, and the output of AND gate 86, and generates the KEN signal as output. The cache control logic 66 includes writable register bits 100 and 102. A decoder 104 decodes the address signals A<30:16> and CPU control signals 30 to enable writing of the data bus 18 bits D<1> and D<0> into register bits 100 and 102 respectively.

Register bit 100 when set (binary '1') indicates that SMRAM accessed at 400DXXXXH is non-cacheable, and when reset indicates that SMRAM is cacheable. When A<30> is deasserted as indicated at the output of invertor 106, or register bit 100 is asserted as indicated at the output of 'OR' gate 107, and the SMRAM_EN signal is asserted as indicated at the output of 'AND' gate 108, the signal SMRAM_NO_CACHE is asserted. Thus, SMRAM_NO_CACHE is asserted when register bit 100 is set, and the CPU accesses SMRAM in the 400DXXXXH space. SMRAM_NO_CACHE is also asserted for SMRAM accesses from the DXXXXH system address space, as overlaid SMRAM is always non-cacheable.

Register bit 102 when set (binary '1') indicates that system memory accessed at DXXXXH is non-cacheable, and when reset indicates that system memory at DXXXXH is cacheable. Register bit 102 is logically "anded" via AND gate 110 with the output of AND gate 86, which is asserted whenever an access occurs to the DXXXXH space and the CPU 12 is not in SMM. Thus, the output of AND gate 110, DX_NO_CACHE, is asserted when register bit 102 is set and the CPU 12 is not in SMM and is accessing the DXXXXH space.

The SMRAM_NO_CACHE and DX_NO_CACHE signals are logically "or'ed" via 'OR' gate 111 to produce the KEN_EN signal, which therefore is asserted during any noncacheable access to the DXXXXH or 400DXXXXH spaces. KEN_EN is input to a state machine 112. The state machine 112 deasserts the KEN signal in response to the assertion of the KEN_EN signal, and ensures that the KEN signal is deasserted according to the timing constraints specified for the CPU 12. (Note that KEN is an active low signal according to the INTEL486™ specification—thus its deasserted level will be a binary '1'.)

It should be noted that, regardless of the type of cache employed, caching the DXXXXH space and the 400DXXXXH space requires that the CPU 12's internal cache be operated as a "write-through" cache—that is, the system memory 20 is updated whenever the cache 14 is written. If the cache 14 is operated as a "write-back" cache—that is, if system memory 20 is updated with the contents of a cache entry only when that entry is being replaced with data from another location in system memory—cache coherency problems can result. For instance, assume the DXXXXH address space has been set cacheable via register bit 100. If the cache 14 is of the write-back type, and if the CPU 12 accesses SMRAM at the 400DXXXXH space during SMM, it may attempt to cache the 400DXXXXH data at a location in the cache 14 containing data from DXXXXH that was stored there when the CPU 12 was in normal operating mode. If the DXXXXH data is written back at this point, while SMIACT is asserted, it will be written to SMRAM instead of the DXXXXH memory address, thus corrupting both SMRAM 22 and the DXXXXH memory address space.

The embodiment shown in FIG. 4 is intended as a logical representation of one of many possible embodiments of the invention, the scope of the invention encompassing any implementation of SMRAM as both overlaid and non-overlaid. One skilled in the art will realize, for instance, that the invention can be implemented using any size DRAMs. With smaller DRAMs, the redirection of memory accesses from the DXXXXH space to the AXXXXH space might be accomplished through the use of memory bank selects, thereby eliminating the need to multiplex memory address signals.

In addition, the address spaces chosen for cacheable and non-cacheable SMRAM are arbitrary. In the embodiment shown in FIG. 4, 4 Mbytes of DRAM are provided, and thus the 400DXXXXH system address space cannot be directly mapped to a corresponding memory address space. Therefore the memory controller logic remaps the 400DXXXXH space to the AXXXXH space. However, in systems employing more than 4 Mbytes of DRAM, the 400DXXXXH space may be directly mapped to a corresponding memory address space without re-mapping it to the AXXXXH space if so desired. Of course, other system address spaces between 1 Mbyte (10000000H) and 4 Mbytes (3FFFFFFFH) which would directly map to a memory address space within 4 Mbytes could just as easily be mapped as SMRAM in the embodiment shown in FIG. 4. The choice of the DXXXXH area 48 of system memory as overlaid SMRAM is also arbitrary, as overlaid SMRAM can be placed anywhere above the first 640 Kbytes of the system address space.

Figure 5:
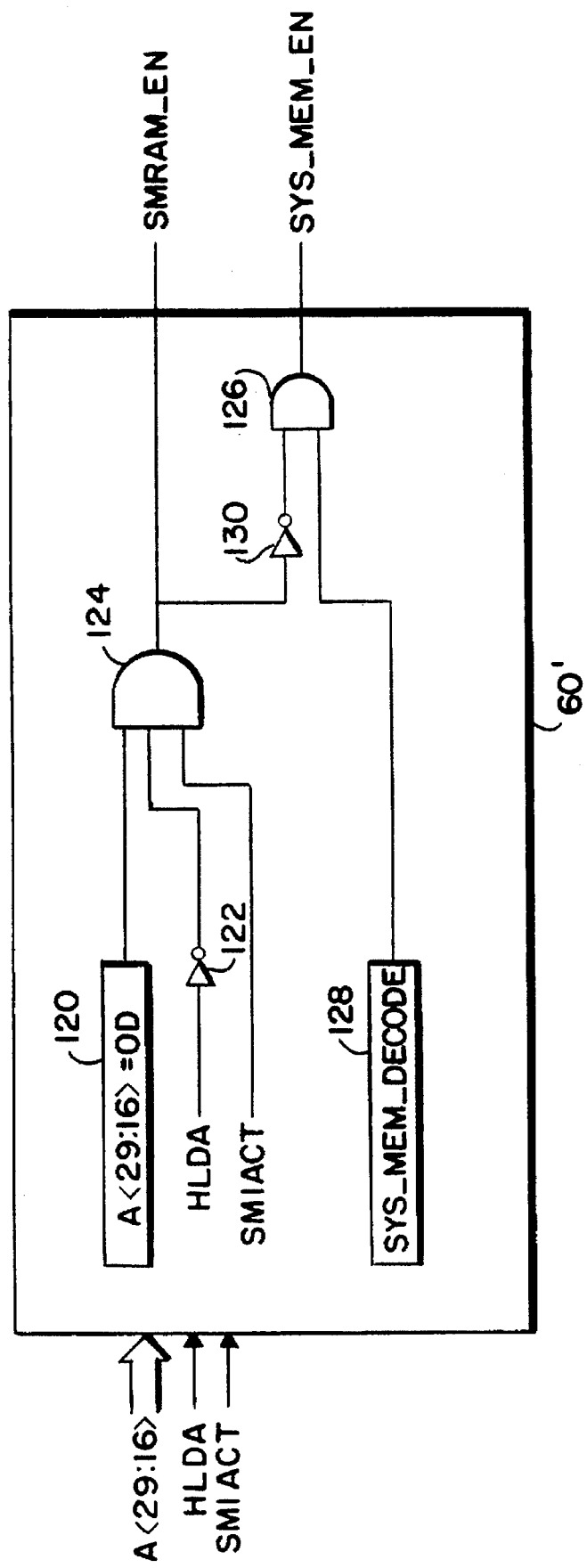
FIG. 5 is a logical representation of an alternative embodiment of the memory controller of FIG. 4.

For systems that do not require CPU accesses to the second address space when the CPU 12 is not in SMM, an alternative memory decoder 60' can be implemented. Referring now to FIG. 5, an address decoder circuit 120 decodes accesses to the DXXXXH space. The output of the decoder circuit 120 is logically 'AND'ed via AND gate 124 with inverted HLDA (via invertor 122) and with the SMIACT signal to provide as output the SMRAM_EN signal. The address signal A30 is ignored; thus, both the DXXXXH and 400DXXXXH address spaces are decoded by the memory decoder 60' as SMRAM. Thus, the SMRAM_EN signal according to this implementation is simply a decode of the '0D' space when the SMIACT signal is asserted, indicating the CPU is in SMM, and the HLDA signal is deasserted, indicating that there is no bus master. Note that, according to this implementation, the only time the CPU 12 has access to the portion of the physical system memory 20 dedicated to SMRAM 22 is when the CPU is in SMM.

The SYS_MEM_EN signal shown in FIG. 5 is provided simply by logically 'AND'ing (via AND gate 126) the output of an address decoder circuit 130, which provides a decode of the entire memory address space, with inverted (via inverter 130) SMRAM_EN. System memory is thereby decoded whenever SMRAM_EN is deasserted.

It is apparent that, within the scope of the invention, modifications and different arrangements may be made other than as herein disclosed. The present disclosure is merely illustrative, the invention comprehending all variations thereof.

What is claimed is:

1. A computer system, comprising:
    a processor capable of operating in at least two modes of operation including a system management mode;
    a system memory having memory addresses and coupled to the processor, a particular portion of the memory addresses of the system memory used by the processor when the processor is performing a task associated with the system management mode, the processor being capable of generating a range of system addresses, the range of system addresses including a particular subrange of system addresses for accessing the particular portion of the memory addresses; and a memory controller coupled to the processor for decoding system addresses, the memory controller enabling access to the particular portion of the memory addresses when decoding system addresses of the particular subrange generated by the processor regardless of whether the processor is operating in the system management mode.

2. The computer system according to claim 1 wherein the range of system addresses includes a second subrange of system addresses and the memory controller enables access to the particular portion of the memory addresses when the processor is operating in the system management mode and the memory controller is decoding system addresses of the second subrange.

3. The computer system according to claim 2 wherein the memory addresses of the system memory includes a second portion of memory addresses and the memory controller enables access to the second portion of memory addresses when the memory controller is decoding system addresses of the second subrange and the processor is operating in one of the modes other than the system management mode.

4. The apparatus of claim 3 wherein the system memory includes more than 1 Mbyte memory addresses, and wherein each memory address of the particular portion of memory addresses and each memory address of the second portion of memory addresses is below an address of 1 Mbyte.

5. The computer system according to claim 3 further comprising a bus master coupled to the processor and capable of accessing the system memory by generating system addresses, the memory controller enabling access to the second portion of memory addresses when the memory controller is decoding system addresses of the second subrange generated by the bus master and the processor is operating in the system management mode.

6. The apparatus of claim 2 wherein the range of system addresses includes more than 1 Mbyte system addresses, and wherein each system address of the second subrange is below an address of 1 Mbyte, and wherein each system address of the particular subrange of system addresses is at or above an address of 1 Mbyte.

7. The computer system according to claim 1 wherein the particular subrange of system addresses is used only for accessing the particular portion of memory addresses.

8. The computer system according to claim 1 wherein the particular portion of memory addresses stores data to be used only in performing operations associated with the system management mode.

9. A computer system, comprising:

a processor capable of operating in at least two modes of operation including a system management mode;

a system memory having memory addresses and coupled to the processor, a particular portion of the memory addresses of the system memory used by the processor when the processor is performing a task associated with the system management mode, the processor being capable of generating a range of system addresses, the range of system addresses including a particular subrange of system addresses for accessing the particular portion of the memory addresses;

a cache memory in an operating relationship with the processor for storing data associated with the system memory; and a memory controller coupled to the processor for decoding system addresses, the memory controller enabling access to the particular portion of the memory addresses when decoding system addresses of the particular subrange regardless of whether the processor is operating in the system management mode and indicating to the processor whether data associated with the enabled particular portion of memory addresses can be stored in the cache memory.

10. The computer system according to claim 9 wherein the cache memory is internal to the processor.

11. The computer system according to claim 9 wherein the cache memory operates as a write-through cache where the system memory is updated whenever the cache memory is written.

12. The computer system according to claim 9 wherein the range of system addresses includes a second subrange of system addresses and the memory controller enables access to the particular portion of the memory addresses when the processor is operating in the system management mode and the memory controller is decoding system addresses of the second subrange.

13. The computer system according to claim 9 wherein the memory controller includes cache control logic for providing a signal to the processor to indicate whether data associated with the enabled particular portion of memory addresses can be stored in the cache memory.

14. The apparatus of claim 9 wherein the range of system addresses includes more than 1 Mbyte system addresses, and wherein each system address of the particular subrange of system addresses is at or above an address of 1 Mbyte.

15. In a computer system having a system memory and a processor that is capable of generating a range of system addresses and of operating in at least two modes of operation including a system management mode, a method for accessing the system memory comprising the steps of:

operating the processor in one of the modes of operation;

allocating a particular portion of memory addresses of the system memory for use by the processor when the processor is performing a task associated with the system management mode;

designating a particular subrange of the range of system addresses for accessing the particular portion of the system memory;

decoding system addresses generated by the processor; and enabling access to the particular portion of the system memory, regardless of whether the processor is operating in the system management mode, when the decoded system addresses are of the particular subrange.

16. The method according to claim 15 further comprising the steps of:

designating a second subrange from the range of system addresses for accessing the particular portion of the system memory; and enabling access to the particular portion of the memory addresses when the processor is operating in the system management mode and the decoded system addresses are of the second subrange.

17. The method according to claim 16 further comprising the step of indicating to the processor whether data associated with the enabled particular portion of memory addresses can be stored in a cache memory.

* * * * *